(12) United States Patent
Hudson et al.

(10) Patent No.: US 6,650,070 B1
(45) Date of Patent: Nov. 18, 2003

(54) POINT OF USE LIGHTING CONTROLLER

(75) Inventors: James Hudson, Wauconda, IL (US);
Thomas J. Mayer, Wauconda, IL (US)

(73) Assignee: Varon Lighting, Inc., Elmhurst, IL (US)

( * ) Notice: Subject to any disclaimer, the term of this patent is extended or adjusted under 35 U.S.C. 154(b) by 0 days.

(21) Appl. No.: 10/205,169

(22) Filed: Jul. 25, 2002

(51) Int. Cl.[7] ............................................... H05B 37/00
(52) U.S. Cl. ........................ 315/312; 315/316; 315/307
(58) Field of Search ................................. 315/312, 194, 315/291, DIG. 4, 307, 224, 293, DIG. 5, 297, 316; 323/256, 257

(56) References Cited

U.S. PATENT DOCUMENTS

| | | | |
|---|---|---|---|
| 3,622,838 A | 11/1971 | Michalski | 315/241 |
| 4,037,148 A | 7/1977 | Owens et al. | 323/7 |
| 4,048,543 A | 9/1977 | Owen et al. | 315/205 |
| 4,230,971 A | 10/1980 | Gerhard et al. | 315/307 |
| 4,242,614 A | 12/1980 | Vatis | 315/153 |
| 4,434,388 A * | 2/1984 | Carver et al. | 315/307 |
| 4,870,555 A | 9/1989 | White | 363/21 |
| 4,928,038 A | 5/1990 | Nerone | 315/DIG. 4 |
| 4,928,220 A | 5/1990 | White | 363/56 |
| 5,036,444 A | 7/1991 | Hiles | 362/188 |
| 5,059,871 A * | 10/1991 | Pearlman et al. | 315/316 |
| 5,382,918 A | 1/1995 | Yamatake | 514/338 |
| 5,691,605 A * | 11/1997 | Xia et al. | 315/307 |
| 5,872,429 A * | 2/1999 | Xia et al. | 315/194 |
| 5,917,717 A | 6/1999 | Arts et al. | 363/34 |
| 6,011,363 A | 1/2000 | Allison | 315/307 |
| 6,075,326 A | 6/2000 | Nostwick | 315/307 |
| 6,204,614 B1 | 3/2001 | Erhardt | 315/307 |

* cited by examiner

*Primary Examiner*—James Clinger
(74) *Attorney, Agent, or Firm*—Leon I. Edelson; William C. Clarke; Levenfeld Pearlstein

(57) ABSTRACT

The instant invention relates to a solid state low voltage power supply controller which reduces a conventional 120 volt AC power source to 12 volt pulsating DC for the purpose of operating a single "point of use" light source wherein the low voltage power supply is in proximate location to the light source. A pulse width modulator integrated circuit operating in conjunction with a field effect transistor induces energy in the secondary of a step-down transformer to provide a reduced pulsating DC current to a lamp load. A feedback voltage from the secondary winding of the stepdown transformer operates to set the gain of internal circuitry of the integrated circuitry to provide a predetermined constant pulsating DC voltage and a predetermined limited range of power wattage. A feedback voltage operates to reduce current drawn by overcurrent demands on the primary of the transformer.

11 Claims, 1 Drawing Sheet

POINT OF USE LIGHTING CONTROLLER

FIELD OF THE INVENTION

This invention relates to a lighting controller circuit for lamps and lamp loads. More particularly, this invention concerns an operating circuit for lamps wherein lamp intensity remains constant over a wide range of input voltages by providing a regulated output voltage limited to 12 volts to the lamp and lamp load, regardless of input line variations. The controller circuit for voltage regulated output allows use of varied lamp wattages.

The present invention accordingly relates to an operating circuit for lamps and lamp loads wherein a voltage controller regulates output voltage to maintain 12 volts regardless of input line variations. In particular, this invention relates to a solid state DC operating circuit for pulsed operation of loads comprising lamps. The circuit is designed to reduce conventional 120 volt AC to 12 volt pulsating DC to operate a "point of use" light source located within or very near the lighting controller circuit. The output voltage remains constant and output current is limited to avoid an overcurrent condition from load current demands. The output power is limited to a range of from 20 to 75 watts to eliminate the effects of current overlead, improper wiring or any other cause of current overload.

It is an object of this invention to provide a pulsating DC voltage operating circuit for operation of lamps and lamp loads from a conventional 120 volt AC source to supply a constant output of pulsating DC voltage.

It is further object of this invention to provide a pulsating DC voltage operating circuit for operation of loads which is self-controlling to avoid an overcurrent condition from load current demands.

It is another object of this invention to provide a circuit to provide a constant pulsating DC voltage output and operates to avoid an overcurrent condition from load current demands by limiting output current.

In view of the above objects, the present invention relates to a load operating circuit comprising, in combination, an AC power source; a full wave bridge rectifier circuit to convert the AC line voltage to pulsating DC voltage; a switch means across said full wave bridge rectifier circuit comprising a pulse width modulator (PWM) controller integrated circuit comprising an oscillator circuit to produce an output voltage to bias the gate of a field effect transistor to induce energy into the primary of a step-down transformer; a circuit comprising a capacitor and a resistor to set the oscillator frequency to produce an output voltage by the integrated circuit to bias the gate of said field effect transistor; a circuit comprising a capacitor and a resistor to set the oscillator frequency to produce an output voltage by the integrated circuit to bias the gate of said field effect transistor; a step-down transformer with a primary winding and two secondary windings, the primary winding receiving energy from said field effect transistor and pulsating DC voltage from rectified AC line voltage of said bridge rectifier circuit, the first secondary winding providing lower voltage to the lamp load, the second secondary winding providing a feedback voltage to said switch means by a feedback voltage regulator circuit; a field effect transistor turned on by output voltage from said switch means to bias the gate of said field effect transistor; a voltage regulator circuit regulating the voltage input to the switch means said voltage regulator circuit comprising a zener diode, a line voltage-dropping resistor, a line voltage filter capacitor; a feedback voltage regulator circuit from said second secondary winding of said transformer to said switch means through a first center connection divider network of two capacitors and a second center connection divider network of two resistors to provide feedback voltage developed over said feedback circuit to feed a control circuit of said switch means; a control circuit for said switch means to set the gain of internal circuitry of the switch means comprising the pulse width modulator integrated circuit, and operates to set the gain of said internal circuitry; an internal circuit within said switch means to compare said feedback voltage developed over said feedback circuit with predetermined voltage levels produced by said oscillator circuit of said PWM integrated circuit to set oscillator output frequency to reduce overcurrent product of increased lamp load draw, whereby output DC voltage pulse duration of said PWM integrated circuit to said field effect transistor controls the DC voltage output of said transformer to supply a constant output voltage applied to the load; a voltage sensing circuit comprising a voltage sensing resistor to provide a voltage proportional to current drawn through the said field effect transistor and the primary of said step down transformer to cause the pulse width modulation voltage of the PWM modulator to the gate of the field effect transistor to respond to changes in the load to limit the output current to the lamp load.

BACKGROUND OF THE INVENTION

The output of the low voltage power supply by a voltage controller of this invention is regulated or limited by a voltage controller to maintain a low voltage of limited range to operate a lamp wherein lamp intensity remains constant over a wide range of input voltages to the controller by providing constant power, as measured in watts, to operate the lamp, the regulated voltage of 12 volts pulsating DC to the lamp providing power of from 20 to 75 watts. In the instant invention, a field effect transistor is utilized to effect control over a wide range of input voltage in conjunction with a pulse width modulator (PWM) circuit; a feedback loop is utilized to effect control of current drawn by the lamp load in conjunction with the pulse width modulator (PWM) circuit.

In the prior art, Hiles, U.S. Pat. No. 5,036,444 discloses a high intensity lamp which uses a voltage regulator to correct power input to a lamp bulb in the event of variation of power loss due to wear and tear on the electrodes of the high intensity lamp and variations due to magnetism or shock. The devise utilizes pulse width modulation (PWM) to regulate the output of the voltage regulator. Output of the voltage regulator amplifier is connected to one input of the amplifier of the PWM circuit. The other input is connected to the output of a frequency oscillator and triangle wave generator. A zener diode acts as a circuit protector. Vatis, U.S. Pat. No. 4,242,614 discloses a lamp lighting control system which provides constant wattage to maintain light output at a desired level A power supply circuit is connected to an autotransformer to provide a voltage regulated direct current, a trigger circuit for firing a triac, a differential amplifier circuit to control the phase interval at which the triac is fired, and a voltage reference circuit between the lamp and the trigger circuit to control the voltage reference circuit. Owens, U.S. Pat. No. 4,037,148 discloses a ballast control device for a lamp which compensates for variation in line voltage and lamp voltage by controlling the power supply by coupling a triac to the supply line, a triggering current for firing the triac, a non-linear amplifier current for controlling the phase interval of firing the triac, a synchronizing circuit for synchronizing the triac firing with the lamp voltage and a voltage reference circuit for controlling the non-linear amplifier circuit in response to changes in the lamp voltage. Owens, et al., U.S. Pat. No. 4,048,543, discloses a lamp operating circuit of a thysistor switch in series with the lamp, an RC timing circuit for turning on the switch and an LC circuit for turning off the switch, a transformer secondary winding in series with a diode to clamp voltage of the primary winding. The arrangement provides control of lamp wattage with changes in lamp voltage. Michalski, U.S. Pat. No. 3,622,838 discloses a pulsed electric system for operating a gas discharge lamp which automatically controls an alternating current supply to maintain constant lamp output using bidirectional thyristors (triacs) as switching means which are turned on by diode AC switches. The gas discharge lamp is operatively connected directly across the AC supply source. The switching means is controlled to energize the lamp, dividing each half cycle. The discharge lamp is operated in series with the switching means directly from the power lines without use of conventional energy storage devices such as capacitors or an inductor. White, U.S. Pat. No. 4,928,220 discloses a switching mode DC-to-DC power supply with current sensing which uses feedback to control output voltage and maintain a constant voltage. The power supply circuit has a power MOS transistor connected in series with half of the primary of a center-tapped transformer and has rectifiers in series with an inductive load on the secondary side. The gate of the power transistor is driven by a pulse width modulated source. The pulse width modulator is an integrated circuit of standard design. An inhibit circuit is included which responds to current through the power transformer to prevent current spikes from affecting the pulse width modulator.

A variety of other proposals have been made embodying control circuits for lamps. Illustrative proposals are those set forth in U.S. Pat. No. 6,204,614 B1 to Robert Erhardt; U.S. Pat. No. 6,011,363 to Joseph M. Allison; U.S. Pat. No. 6,075,326 to Allan A. Nostwick; U.S. Pat. No. 5,917,717 to Paulus P. B. Arts, et al.; U.S. Pat. No. 4,928,038 to Louis R. Nerone; and U.S. Pat. No. 4,230,971 to Francis H. Gerhard, et al. A switching rectifier power supply circuit is taught in U.S. Pat. No. 4,928,220 to Allan V. White, as is a rectifier power supply circuit which has a pair of power MOS transistors, the gates of which are driven by a pulse-width modulator source, in U.S. Pat. No. 4,870,555 to Allan V. White. An integrated circuit (IC) switching voltage regulator circuit which produces a 12 volt output independent of load and input voltage fluctuations is taught in U.S. Pat. No. 5,382,918 to Mineo Yamatake.

Although the proposals of these and other patents have addressed selected problems such as lamp life and maintaining light output at selected levels, and controlling lamp wattage with changes in lamp voltage, there yet remains unresolved drawbacks to their use. Thus, for example, among other problems, there have continued to be problems such as maintaining light intensity over a wide range of input voltages and limiting the range of output current from the power source to provide a limited range of output power and eliminate the effect of current overload due to improper wiring or any other cause of current overloading of the power supply.

Although various of the foregoing problems have been partly addressed by prior proposals, there has continued to be a need for a comprehensive low voltage power supply circuit that supplies power regardless of lamp voltages; that maintains a constant lamp output over a wide range of voltages which will extend lamp life; wherein the circuit is not load or wattage sensitive; when a short or overload condition is detected, the device will "go to sleep"; when the short/overload is removed, the device will "wake up", and eliminate the need to replace a fuse or operate a circuit breaker.

Accordingly, in the prior art it is well-known to utilize a means for controlling line voltage to reduce line variations or to control power to supply line power (wattage) at a constant value. In general, it is well-known to utilize a feedback method to obtain the needed control using solid state circuitry to obtain the desired results, in some cases, the solid state circuitry being in the form of integrated circuits commercially available. However, the concept of each element of the instant invention, the related use of an integrated circuit in conjunction with a field effect transistor and feedback control circuits, the need to obtain a regulated voltage output of 12 volts DC regardless of input line variations to obtain constant wattage to a lamp so that lamp intensity remains constant over a wide range of input line voltage variations, and the need to limit output current to avoid an over current condition from load current demands and to supply the provision and use of power from 20 watts to 75 watts have not been known to the inventor. While other prior patents make reference to various constant wattage and voltage regulating functions, none that are known to the inventor hereof reveal a specific workable circuit for achieving and meeting the above needs of supplying proper voltage and current levels regardless of lamp wattages at a low cost.

SUMMARY OF THE INVENTION

This invention relates to a novel voltage controller designed to reduce a conventional 120 volt AC power source to 12 volts pulsating DC for the purpose of operating a single "point of use" light source or lamp wherein the controller is located within the light source or lamp support, or very near thereof, and wherein the output from the controller is regulated to maintain a constant 12 volt pulsating DC output despite input line variations in operation of the light source and to control the current output of the voltage controller to within a narrow range of power as measured in watts. Lamp intensity remains constant over a wide range of line input voltages by providing constant limited wattage to the lamp. A feedback loop effectuates such control in conjunction with a pulse width modulator (PWM) circuit. A diode bridge network on the AC line input provides pulsating voltage to the switching element comprising a PWM integrated circuit interval oscillator. An output pulse therefrom in conjunction with a field effect transistor controls the reduced supply voltage to the load through a transformer. A feedback voltage to the PWM integrated circuit from the load side of the transformer sets the gain of the internal circuitry of the PWM integrated circuit. Current demands on the transformer secondary are sensed by solid state circuitry of a feedback loop. If the voltage sensed by the PWM integrated circuit exceeds predetermined levels, as a product of overcurrent, output pulse duration is reduced to safe levels by the feedback circuitry.

DETAILS OF THE INVENTION

Figure 1:
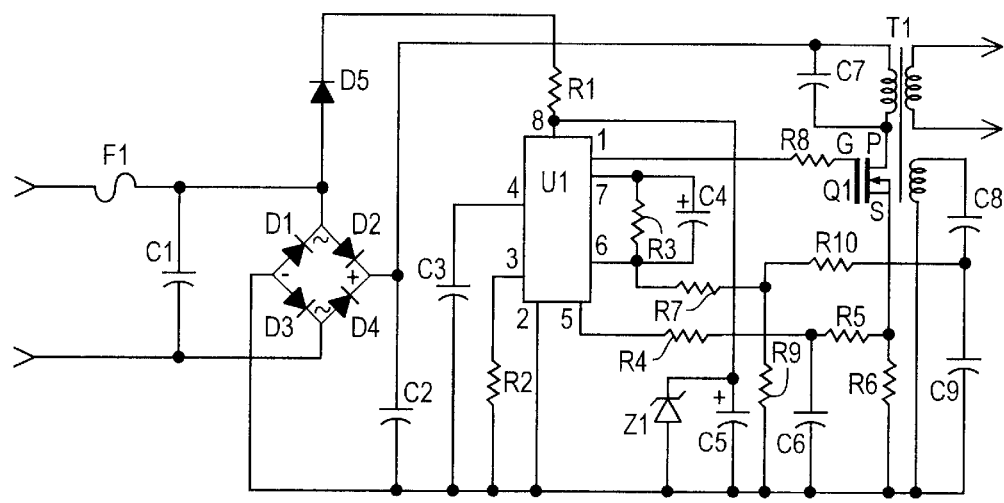
FIG. 1 is a schematic diagram of the point of use lighting controller of the invention.
Figure 2:
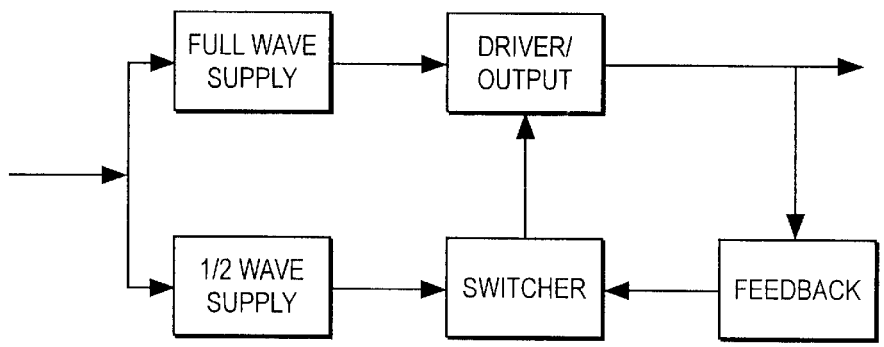
FIG. 2 is a simplified block diagram of the point of use lighting controller of the invention.

In the prior art, switch mode power supplies are used to control the transfer of energy from source to load through the use of pulse width modulator techniques. In the instant invention, a pulse width modulator integrated circuit, in conjunction with a step-down transformer and a feedback voltage from the secondary side of the transformer, operate to provide a constant output voltage and limited range of output current with output power of 20 to 75 watts, output current being limited to prevent circuit overloading. Alternating current from the power source of 120 volts AC is rectified as obtained by a full wave rectifier using a bridge network of four diodes after the input AC line noise is suppressed by a capacitor. Referring to FIG. 1, line conditioning of the input line is provided by Capacitor C1 and C2, diodes D1, D2, D3, D4. Capacitor C1 is a line noise suppressor while D1–D4 convert the AC line voltage to pulsating DC current. Fuse F1 is a fast blow fuse on the AC input line. Capacitor C2 serves as a filter to smooth the pulsating direct current and provide energy storage to be used during peak energy demands by the switching element.

The switching element circuitry operates as the direct current across capacitor C2 provides supply voltages to the integrated circuit U1 through resistor R1 as well as a voltage source to output transformer T1 primary windings. Integrated circuit U1 is a basic pulse width modulator integrated circuit where the switching frequency of integrated circuit U1 is determined by capacitor C3 and resistor R2.

Control and regulation of the alternating current portion of the output power and maintenance of the 12-volt output is obtained by use of integrated circuit U1, a standard type 8-pin PWM controller suitable for both voltage mode and current mode control similar to a standard type UC 3842 power supply integrated circuit, TK 75005. It contains an oscillator and a power latch and provides a sawtooth current from the feedback pin which provides a slope compensation ramp (in current mode application) with error amplifier and overvoltage protection functions; internal user-adjustable slope compensation; pulse-by-pulse current limiting.

Integrated circuit U1 is provided in the switching element circuitry with a simple voltage regulator composed of voltage dropping resistor R1, which reduces the higher voltage available from capacitor C2, a filter capacitor C5 and a zener diode Z1. As line voltage increases to adequate levels, integrated circuit U1 begins to oscillate internally as set by capacitor C3 and resistor R2.

This oscillation provides an output pulse at pin one of U1 which momentarily forward biases the gate of field effect transistor Q1 through the resistor R8. Field effect transistor Q1 is turned on briefly, inducing energy into the primary of transformer T1. Each time field effect transistor Q1 turns on and off, the energy stored in the primary of transformer T1 is induced into the secondary which provides a reduced pulsating DC current to a lamp connected to the secondary of transformer T1. Capacitor C7 serves to control the collapse of energy stored in transformer T1 primary, providing a better magnetic coupling between transformer T1 primary and secondary winding, as indicated in FIG. No. 1 and No. 2.

Output control circuitry is provided. As it is possible for output voltages at the load side of transformer T1 to exceed demands, a feedback loop is provided as a third winding on transformer T1, where one side of the feedback winding is connected to power supply minus and the remaining side is connected to a pulsating DC divider network comprised of capacitors C8 and C9, thus providing a much cleaner wave shape than a resistor divider circuit could. Output of capacitors C8 and C9 is then connected to a second divider network comprised of resistors R9 and R10, further reducing the voltage to a usable level. This voltage is provided to voltage sensing pin 6 of integrated circuit U1 through resistor R7. Resistor R3 and capacitor C4 are connected between pin 6 and pin 7 of integrated circuit U1 to set the gain of circuitry internal to integrated circuit U1. Resistor R7 aids in setting the ratio of this circuit. As the output voltage of transformer T1's third winding, and the load winding exceeds this gain set by resistors R3, R7, and capacitor C4, the output pulse duration to field effect transistor Q1 gate is cut short, reducing the average output voltage of transformer T1 secondary winding to the load. The transformer T1 secondary to load voltage is not measured directly as this would compromise its line/load isolation provided by transformer T1.

As the load on the output of transformer T1 increases, so also do the current demands on the primary of transformer T1 through field effect transistor Q1. To avoid an overcurrent condition, the source pin of field effect transistor Q1 is fed through current sensing resistor R6 which is directly proportional to the current drawn through field effect transistor Q1 and the primary of transformer T1. This voltage is sensed through feedback pin 5 of integrated circuit U1 through resistor R4. Again, as with the voltage sensing circuitry, if the voltage available at resistor R4 exceeds predetermined levels, a product of overcurrent, the output pulse duration to field effect transistor Q1 gate is reduced to safe levels.

While it is understood that its present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the scope of such disclosure.

In summary, the instant invention comprises a lighting controller circuit for lamps and lamp loads comprising, in combination, an AC power source, a full wave bridge rectifier circuit across said AC power source to convert AC line voltage to pulsating DC output voltage, a switch means across said full wave bridge rectifier circuit comprising a pulse width modulator (PWM) controller integrated circuit comprising an oscillator circuit to produce an output voltage by said PWM to bias the gate of a field effect transistor to induce energy into the primary of a step-down transformer, a circuit comprising a capacitor and a resistor to set the said oscillator frequency to produce said output voltage by said PWM, said step-down transformer with a primary winding and two secondary windings, said primary winding receiving energy from said field effect transistor and pulsating DC voltage from rectified AC line voltage of said bridge rectifier circuit, the first secondary winding providing lower voltage to a lamp load, the second secondary winding providing a feedback voltage to said switch means by a feedback voltage regulator circuit, said field effect transistor turned on by output voltage from said switch means to bias the gate of said field effect transistor, a voltage regulator circuit regulating the voltage input to said switch means comprising a zener diode, a line voltage dropping resistor, a line voltage filter capacitor, said feedback voltage regulator circuit from said second secondary winding of said transformer to said switch means through a first center connection divider network of two capacitors and a second center connection divider network of two resistors to provide feedback voltage developed over said feedback circuit to feed a control circuit of said switch means, said control circuit of said switch means to set the gain of internal circuitry of said switch means comprising said pulse width integrated circuit and operates to set the gain of said internal circuitry, an internal circuit within said switch means to compare said feedback voltage developed over said feedback circuit with predetermined voltage levels produced by said oscillator circuit of said PMW integrated circuit to set oscillator output frequency to reduce overcurrent product of increased lamp load drawn whereby output DC voltage pulse duration of said PWM integrated circuit to said field effect transistor controls DC voltage output of said transformer to supply a constant output voltage applied to the load, a voltage sensing circuit comprising a voltage sensing resistor of current drawn through said field effect transistor and primary of said transformer to provide a voltage proportional to current drawn through said field effect transistor and primary of said transformer to cause pulse width modulation of PWM voltage output to gate of said field effect transistor to respond to changes in the lamp load to limit the output current to the lamp load, wherein output voltage is regulated to maintain 12 volts pulsating DC despite input AC voltage line variations and wherein lamp intensity of the lamp load remains constant and wherein said voltage output permits use of multiple lamp wattages and wherein said multiple lamp wattages are from 20 to 75 watts and wherein said pulse width modulator integrated circuit operating in conjunction with said field effect transistor induces energy in said step-down transformer to provide a reduced DC pulsating current to said lamp load and whereon said feedback voltage from said second secondary winding of said transformer to said pulse width modulator integrated circuit operates to set the gain of said internal circuit of said integrated circuit to provide a predetermined constant DC pulsating voltage output and wherein said feedback voltage from said voltage sensing resistor of current drawn through said field effect transister and primary winding of said transformer to said pulse width modulator integrated circuit causes pulse width modulation of said integrated circuit to respond to changes in load of said lamp to limit the output current to said lamp load and wherein overcurrent drawn by said lamp load exceeding predetermined levels as sensed by said voltage sensing resistor operates to provide a voltage proportional to current drawn through said field effect transistor and the said primary of said step-down transformer to cause pulse width modulation of said integrated circuit to respond to said overcurrent to reduce the voltage available to said integrated circuit to reduce the output pulse duration to said field effect transistor to reduce said overcurrent and wherein said feedback voltage regulator circuit to said switch means comprises a regulating means to regulate said output voltage applied to the lamp load and wherein said regulating means comprises a pulse width modulator controller with current-mode and voltage-mode control, internal user-adjustable slope compensation, and pulse-by-pulse current limiting.

What is claimed is:

1. A lighting controller circuit for lamps and lamp loads comprising, in combination,
  a. an AC power source;
  b. a full wave bridge rectifier circuit across said AC power source to convert AC line voltage to pulsating DC output voltage;
  c. a switch means across said full wave bridge rectifier circuit comprising a pulse width modulator (PWM) controller integrated circuit comprising an oscillator circuit to produce an output voltage by said PWM to bias the gate of a field effect transistor to induce energy into the primary of a step-down transformer;
  d. a circuit comprising a capacitor and a resistor to set the said oscillator frequency to produce said output voltage by said PWM;
  e. said step-down transformer with a primary winding and two secondary windings, said primary winding receiving energy from said field effect transistor and pulsating DC voltage from rectified AC line voltage of said bridge rectifier circuit, the first secondary winding providing lower voltage to a lamp load, the second secondary winding providing a feedback voltage to said switch means by a feedback voltage regulator circuit;
  f. said field effect transistor turned on by output voltage from said switch means to bias the gate of said field effect transistor;
  g. a voltage regulator circuit regulating the voltage input to said switch means comprising a zener diode, a line voltage dropping resistor, a line voltage filter capacitor;
  h. said feedback voltage regulator circuit from said second secondary winding of said transformer to said switch means through a first center connection divider network of two capacitors and a second center connection divider network of two resistors to provide feedback voltage developed over said feedback circuit to feed a control circuit of said switch means;
  i. said control circuit of said switch means to set the gain of internal circuitry of said switch means comprising said pulse width integrated circuit and operates to set the gain of said internal circuitry;
  j. an internal circuit within said switch means to compare said feedback voltage developed over said feedback circuit with predetermined voltage levels produced by said oscillator circuit of said PMW integrated circuit to set oscillator output frequency to reduce overcurrent product of increased lamp load drawn whereby output DC voltage pulse duration of said PWM integrated circuit to said field effect transistor controls DC voltage output of said transformer to supply a constant output voltage applied to the load;
  k. a voltage sensing circuit comprising a voltage sensing resistor of current drawn through said field effect transistor and primary of said transformer to provide a voltage proportional to current drawn through said field effect transistor and primary of said transformer to cause pulse width modulation of PWM voltage output to gate of said field effect transistor to respond to changes in the lamp load to limit the output current to the lamp load.

2. The circuit of claim 1 wherein output voltage is regulated to maintain 12 volts pulsating DC despite input AC voltage line variations.

3. The circuit of claim 1 wherein lamp intensity of the lamp load remains constant.

4. The circuit of claim 1 wherein said voltage output permits use of multiple lamp wattages.

5. The circuit of claim 4 wherein said multiple lamp wattages are from 20 to 75 watts.

6. The circuit of claim 1 wherein said pulse width modulator integrated circuit operating in conjunction with said field effect transistor induces energy in said step-down transformer to provide a reduced DC pulsating current to said lamp load.

7. The circuit of claim 1 whereon said feedback voltage from said second secondary winding of said transformer to said pulse width modulator integrated circuit operates to set the gain of said internal circuit of said integrated circuit to provide a predetermined constant DC pulsating voltage output.

8. The circuit of claim 1 wherein said feedback voltage from said voltage sensing resistor of current drawn through said field effect transister and primary winding of said transformer to said pulse width modulator integrated circuit causes pulse width modulation of said integrated circuit to respond to changes in load of said lamp to limit the output current to said lamp load.

9. The circuit of claim 1 wherein overcurrent drawn by said lamp load exceeding predetermined levels as sensed by said voltage sensing resistor operates to provide a voltage proportional to current drawn through said field effect transistor and the said primary of said step-down transformer to cause pulse width modulation of said integrated circuit to respond to said overcurrent to reduce the voltage available to said integrated circuit to reduce the output pulse duration to said field effect transistor to reduce said overcurrent.

10. The circuit of claim 1 wherein said feedback voltage regulator circuit to said switch means comprises a regulating means to regulate said output voltage applied to the lamp load.

11. The regulating means of claim 10 wherein said regulating means comprises a pulse width modulator controller with current-mode and voltage-mode control, internal user-adjustable slope compensation, and pulse-by-pulse current limiting.

\* \* \* \* \*